United States Patent
Gellert et al.

(10) Patent No.: US 6,648,622 B1
(45) Date of Patent: *Nov. 18, 2003

(54) APPARATUS AND METHOD FOR MULTI-LAYER INJECTION MOLDING

(75) Inventors: Jobst U. Gellert, Georgetown (CA); Denis L. Babin, Acton (CA)

(73) Assignee: Mold Masters Limited (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/274,443

(22) Filed: Mar. 22, 1999

Related U.S. Application Data

(63) Continuation-in-part of application No. 09/271,835, filed on Mar. 18, 1999.

(51) Int. Cl.⁷ .............................................. B29G 45/16
(52) U.S. Cl. ........................ 425/130; 425/563; 425/566; 425/573
(58) Field of Search ........................ 425/130, 562, 425/563, 564, 565, 566, 573

(56) References Cited

U.S. PATENT DOCUMENTS

| | | | |
|---|---|---|---|
| 3,947,177 A | * 3/1976 | Eckardt | 425/130 |
| 4,026,518 A | 5/1977 | Gellert | 251/330 |
| 4,035,466 A | 7/1977 | Langecker | 264/328 |
| 4,082,512 A | 4/1978 | Wingard et al. | 23/252 |

(List continued on next page.)

FOREIGN PATENT DOCUMENTS

| | | | | |
|---|---|---|---|---|
| CA | 1165525 A | 4/1984 | | B29F/1/03 |
| DE | 3201710 A | 8/1982 | | B29F/1/022 |
| EP | 0 374 247 A1 | 6/1990 | | B29C/45/20 |
| EP | 0 688 651 A1 | 12/1996 | | B29C/45/04 |
| EP | 0 768 163 A1 | 4/1997 | | B29C/45/16 |
| EP | 0 799 683 A2 | 10/1997 | | B29C/45/16 |
| EP | 0 839 629 A1 | 8/1998 | | B29C/45/16 |
| EP | 0 873 840 A1 | 10/1998 | | B29C/45/04 |
| EP | 0 894 604 A1 | 2/1999 | | B29C/45/16 |
| EP | 0 901 896 A | 3/1999 | | B29C/45/16 |

(List continued on next page.)

OTHER PUBLICATIONS

Copy of claims of Co-pending application 09/271,835.*
International Search Report dated Jun. 19, 2000, for PCT/IB00/00305.
International Search Report dated Jun. 21, 2000, for PCT/IB00/00299.
International Search Report dated Jun. 26, 2000.
"High Performance Polyester Packaging for Foods & Beverages," *Technologies*, 1996, pp. 42–70.

Primary Examiner—W. L. Walker
Assistant Examiner—Emmanuel Luk
(74) Attorney, Agent, or Firm—McDonnell Boehnen Hulbert & Berghoff

(57) ABSTRACT

An injection molding apparatus and method for multi-layer molding of preforms and closures has a central melt channel, an annular melt channel radially spaced from the central melt channel, and an annular ring channel surrounding the central melt channel. The central melt channel has a first portion for flow of a first material, a second portion for flow of the first material and a second material, and a flow extension connecting the first portion and the second portion. The flow extension has a flow opening in communication with the annular ring channel for flow of the second material. The apparatus and method also include a cavity for receiving flow of the first material and the second material from the central melt channel, and for receiving flow of a third material from the annular melt channel. In addition, the apparatus and method include a first melt passage in communication with the annular melt channel, a second melt passage in communication with the annular ring channel, and a third melt passage in communication with the central channel.

6 Claims, 9 Drawing Sheets

U.S. PATENT DOCUMENTS

| | | | |
|---|---|---|---|
| 4,174,413 A | 11/1979 | Yasuike | 428/35 |
| 4,376,625 A | 3/1983 | Eckardt | 425/564 |
| 4,433,969 A | 2/1984 | Gellert | 425/548 |
| 4,436,778 A | 3/1984 | Dugal | 428/36 |
| 4,472,131 A | 9/1984 | Ryder | 425/526 |
| 4,497,621 A | 2/1985 | Kudert et al. | 425/145 |
| 4,525,134 A | 6/1985 | McHenry et al. | 425/130 |
| 4,526,821 A | 7/1985 | McHenry et al. | 428/35 |
| 4,541,982 A | 9/1985 | Upmeier | 264/349 |
| 4,542,054 A | 9/1985 | Fillmann | 428/68 |
| 4,550,043 A | 10/1985 | Beck | 428/36 |
| 4,568,261 A | 2/1986 | McHenry et al. | 425/145 |
| 4,609,516 A | 9/1986 | Krishnakumar et al. | 264/255 |
| 4,615,925 A | 10/1986 | Nilsson | 428/35 |
| 4,646,925 A | 3/1987 | Nohara | 215/1 C |
| 4,657,496 A | 4/1987 | Ozeki et al. | 425/130 |
| 4,701,292 A | 10/1987 | Valyi | 264/255 |
| 4,710,118 A | 12/1987 | Krishnakumar et al. | 425/130 |
| 4,715,802 A | 12/1987 | Arai | 425/130 |
| 4,717,324 A | 1/1988 | Schad et al. | 425/130 |
| 4,728,549 A | 3/1988 | Shimizu | 428/35 |
| 4,740,151 A | 4/1988 | Schmidt et al. | 425/549 |
| 4,743,479 A | 5/1988 | Nakamura et al. | 428/35 |
| 4,744,742 A | 5/1988 | Aoki | 425/126.1 |
| 4,774,047 A | 9/1988 | Nakamura et al. | 264/513 |
| 4,775,308 A | 10/1988 | Schad et al. | 425/130 |
| 4,781,954 A | 11/1988 | Krishnakumar et al. | 428/35 |
| 4,808,101 A | 2/1989 | Schad et al. | 425/130 |
| 4,847,129 A | 7/1989 | Collette et al. | 428/35.7 |
| 4,863,369 A | 9/1989 | Schad et al. | 425/547 |
| 4,863,665 A | 9/1989 | Schad et al. | 264/255 |
| 4,892,699 A | 1/1990 | Kudert et al. | 264/328.8 |
| 4,895,504 A | 1/1990 | Kudert et al. | 425/133.1 |
| 4,910,054 A | 3/1990 | Collette et al. | 428/35.7 |
| 4,923,723 A | 5/1990 | Collette et al. | 428/35.7 |
| 4,931,234 A | 6/1990 | Schad et al. | 264/40.1 |
| 4,932,858 A | 6/1990 | Gellert et al. | 425/564 |
| 4,934,915 A | 6/1990 | Kudert et al. | 425/132 |
| 4,944,909 A | 7/1990 | Eckardt et al. | 264/255 |
| 4,950,143 A | 8/1990 | Krishnakumar | 425/130 |
| 4,954,376 A | 9/1990 | Krishnakumar et al. | 428/35.7 |
| 4,957,682 A | 9/1990 | Kobayashi et al. | 264/255 |
| 4,965,028 A | 10/1990 | Maus et al. | 264/297.2 |
| 4,978,493 A | 12/1990 | Kersemakers et al. | 264/255 |
| 4,990,301 A | 2/1991 | Krishnakumar | 264/513 |
| 4,994,313 A | 2/1991 | Shimizu | 428/36.7 |
| 5,022,846 A | 6/1991 | Schmidt | 425/564 |
| 5,028,226 A | 7/1991 | De'ath et al. | 425/130 |
| 5,030,077 A | 7/1991 | Orimoto et al. | 425/130 |
| 5,032,341 A | 7/1991 | Krishnakumar et al. | 264/255 |
| 5,040,963 A | 8/1991 | Beck et al. | 425/130 |
| 5,049,345 A | 9/1991 | Collette et al. | 264/255 |
| 5,051,227 A | 9/1991 | Brun, Jr. et al. | 264/537 |
| 5,077,111 A | 12/1991 | Collette | 428/36.7 |
| 5,093,053 A | 3/1992 | Eckardt et al. | 264/45.1 |
| 5,094,603 A | 3/1992 | Gellert | 425/130 |
| 5,098,274 A | 3/1992 | Krishnakumar | 425/133.1 |
| 5,106,284 A | 4/1992 | Kobayashi et al. | 425/130 |
| 5,125,817 A | 6/1992 | Yamachika | 425/130 |
| 5,131,830 A | 7/1992 | Orimoto et al. | 425/130 |
| 5,135,377 A | 8/1992 | Gellert | 425/130 |
| 5,141,695 A | 8/1992 | Nakamura | 264/255 |
| 5,143,733 A | 9/1992 | Von Buren et al. | 425/130 |
| 5,151,025 A | 9/1992 | Müller | 425/199 |
| 5,162,121 A | 11/1992 | Kawaguchi et al. | 425/130 |
| 5,200,207 A | 4/1993 | Akselrud et al. | 425/557 |
| 5,202,074 A | 4/1993 | Schrenk et al. | 264/241 |
| 5,215,762 A | 6/1993 | Eder et al. | 425/130 |
| 5,221,507 A | 6/1993 | Beck et al. | 264/255 |
| 5,223,275 A | 6/1993 | Gellert | 425/130 |
| 5,252,268 A | 10/1993 | Ohno | 264/40.7 |
| 5,260,012 A | 11/1993 | Arnott | 264/69 |
| 5,262,119 A | 11/1993 | Smith | 264/513 |
| RE34,552 E | 2/1994 | Krishnakumar et al. | 438/35.7 |
| 5,288,451 A | 2/1994 | Schad | 264/328.8 |
| 5,301,838 A | 4/1994 | Schmidt et al. | 222/95 |
| 5,380,479 A | 1/1995 | Schrenk et al. | 264/241 |
| 5,387,099 A | 2/1995 | Gellert | 425/564 |
| 5,407,629 A | 4/1995 | Schmidt et al. | 264/512 |
| 5,498,150 A | 3/1996 | Check | 425/526 |
| 5,501,593 A | 3/1996 | Marcus | 425/547 |
| 5,523,045 A | 6/1996 | Kudert et al. | 264/513 |
| 5,573,791 A | 11/1996 | Marcus | 425/523 |
| 5,582,788 A | 12/1996 | Collette et al. | 264/297 |
| 5,582,851 A | 12/1996 | Hofstetter et al. | 425/562 |
| 5,589,130 A | 12/1996 | Takada et al. | 264/537 |
| 5,614,233 A | 3/1997 | Gellert | 425/549 |
| 5,628,950 A | 5/1997 | Schrenk et al. | 264/241 |
| 5,628,957 A | 5/1997 | Collette et al. | 264/512 |
| 5,645,786 A | 7/1997 | Okada et al. | 264/255 |
| 5,650,178 A | 7/1997 | Bemis et al. | 425/130 |
| 5,651,998 A | 7/1997 | Bertschi et al. | 425/127 |
| 5,705,202 A | 1/1998 | Gellert | 425/549 |
| 5,795,600 A | 8/1998 | Rozema | 425/562 |
| 5,830,524 A | 11/1998 | Braun | 425/549 |
| 5,843,361 A | 12/1998 | Gellert | 264/297.2 |
| 5,894,023 A | 4/1999 | Schram et al. | 425/130 |
| 5,914,138 A | 6/1999 | Swenson | 425/130 |
| 5,935,614 A | 8/1999 | Blank et al. | 425/130 |

FOREIGN PATENT DOCUMENTS

| | | | |
|---|---|---|---|
| FR | 2 512 389 A | 3/1983 | B29F/1/06 |
| JP | 61230911 | 10/1986 | B29B/11/08 |
| JP | 02022022 | 1/1990 | B29C/45/16 |
| JP | 03024928 | 2/1991 | B29C/45/16 |
| JP | 06226784 | 8/1994 | B29C/45/16 |
| WO | WO 98/13187 | 4/1998 | B29C/45/16 |

* cited by examiner

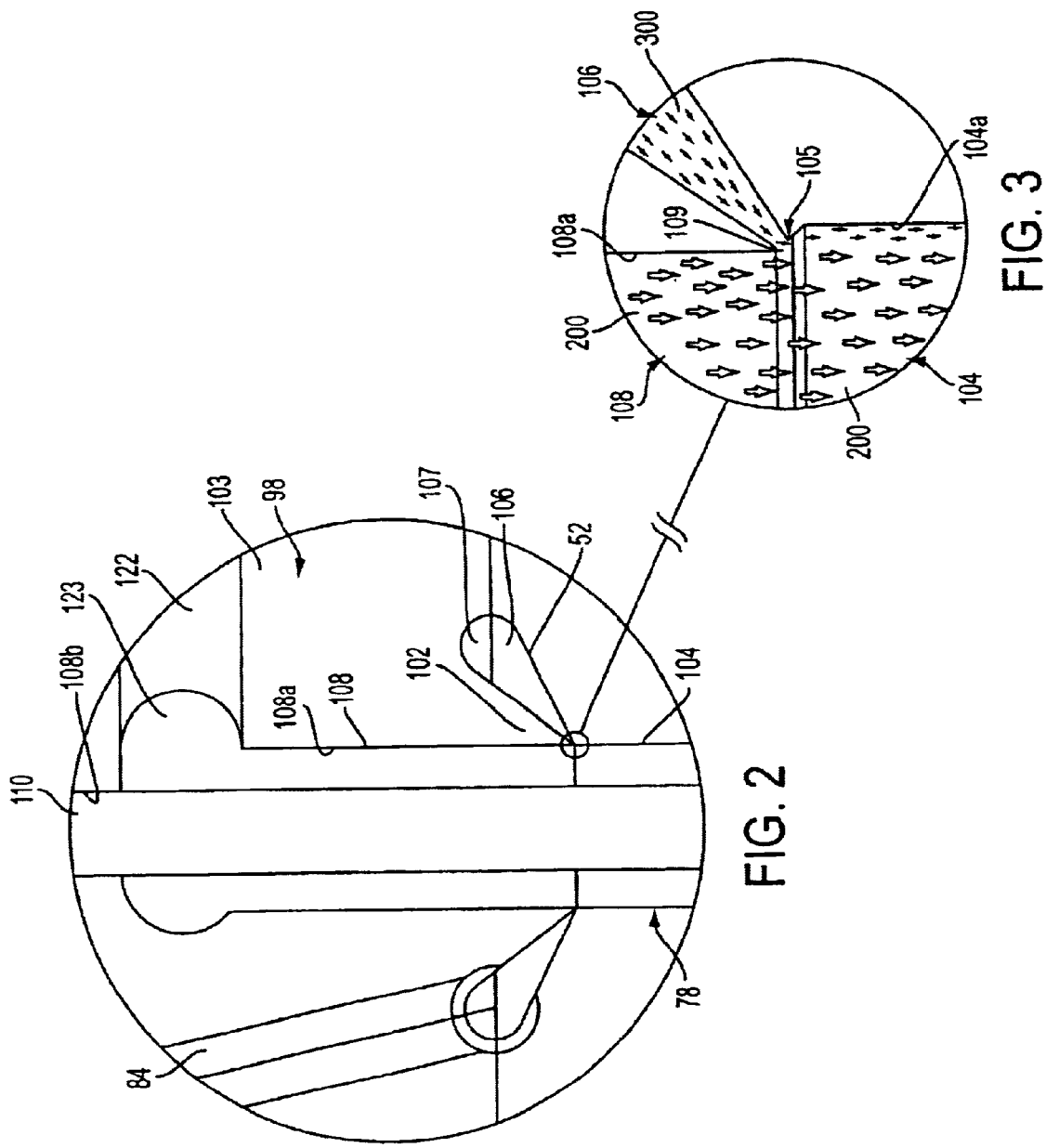

APPARATUS AND METHOD FOR MULTI-LAYER INJECTION MOLDING

This application is a continuation-in-part of U.S. patent application Ser. No. 09/271,835 filed Mar. 18, 1999, now pending and specifically incorporated in its entirety herein by reference.

FIELD OF INVENTION

The present invention relates to multi-layer products, and an apparatus and method for the injection molding of same. More specifically, it relates to a four-layer bottle preform and closure, and an apparatus and method for injection molding of same.

BACKGROUND OF THE INVENTION

Multi-cavity injection molding apparatus for making multi-layer molded products, such as protective containers for food, preforms for beverage bottles, and closures, are well-known. One or more layers of one material are typically molded within, or together with, one or more layers of another material, to form the molded product. At least one of these layers is usually a barrier layer formed from a barrier material to protect the contents of the molded product. Since the barrier material is expensive, typically only a very thin barrier layer is used in the molded product. It is also generally desirable to have this thin barrier layer uniformly and evenly distributed (i.e., well-balanced) throughout the molded product to provide the proper protection for the contents of the molded product.

An example of an injection molding apparatus used to make four-layer preforms with thin barrier layers is disclosed in U.S. Pat. No. 4,990,301 to Krishnakumar et al. Krishnakumar et al. disclose an injection molding device having multiple and selective melt inlets, passages, channels, and gates, requiring different manifold configurations, for forming multiple layer preforms. In particular, Krishnakumar et al. disclose the use of one large central melt passage and three small annular melt passages flowing into a central channel that opens into a cavity for multi-layer preforms. Depending on the application, either the large central melt passage or one of the three small annular melt passages may be chosen for a barrier material. Krishnakumar et al. inject the barrier material from a selected passage into the cavity, either directly against a cooled portion of preform material previously disposed in the cavity, or after injecting a hot portion of preform material from another passage, in addition to the cooled portion, into the cavity.

There are several problems with the device disclosed by Krishnakumar et al. First, the injection molding device disclosed by Krishnakumar et al. uses multiple melt inlets, passages, channels, and gates that require several different configurations for the same manifold, depending on the application, to make multi-layer preforms. As a result, the injection molding device of Krishnakumar et al. is complex and expensive to both manufacture and operate. Second, injecting a barrier material directly against a cooled portion of preform material previously disposed in a cavity often results in an uneven, or interrupted, barrier layer that does not properly protect the contents of the molded preform. An altered and non-uniform barrier layer may also present problems with blowing out the preform. Third, injecting a barrier material only after injecting a hot portion of preform material, in addition to the cooled portion, into a cavity adds additional time to the injection cycle or production time for the preforms.

Finally, the injection molding device disclosed by Krishnakumar et al. uses large and small passages for the flow of barrier material. The large passage can be problematic, since it can retain too much barrier material at a high temperature, thereby causing the degradation of the barrier material. On the other hand, the small passages can cause high pressure drops for the barrier material as it enters the cavity, thereby damaging or washing out the preform material already in the cavity.

Another example of an injection molding apparatus used to make four-layer preforms with thin barrier layers is disclosed in U.S. Pat. No. 5,141,695 to Nakamura. Like Krishnakumar et al., Nakamura discloses a method to produce a three material, four layer preform, where preform material is injected first through an annular melt channel, and barrier layer is injected later from a separate annular melt channel simultaneously with a mixture of preform and barrier material injected through a central melt channel. Besides using multiple annular melt channels, which add to the complexity and expense of the injection molding apparatus, the method disclosed by Nakamura positions the thin barrier layer directly against the cooled portion of preform material already in the cavity. As previously explained, this arrangement results in an uneven, non-uniform, and unbalanced barrier layer within the preform. In addition, the small annular melt channel for the barrier material used in Nakamura's method causes a high pressure drop as the barrier material enters the cavity, thereby potentially causing damage to the preform material already in the cavity.

Accordingly, it would be desirable to have an apparatus and method for injection molding of four-layer preforms or closures that overcomes the problems associated with the prior art by not having multiple melt inlets, passages, channels, and gates, and by having a single configuration for each of its manifolds. An injection molding apparatus and method for injection molding of four-layer preforms or closures without multiple melt inlets, passages, channels, and gates would be relatively simpler and less expensive, both to manufacture and operate.

It would also be desirable to have an apparatus and method for injection molding of four-layer preforms or closures that does not inject a barrier material either directly against a cooled portion of one preform material previously disposed in a cavity, or after injecting a hot portion of another preform material, in addition to the cooled portion, into the cavity. Such an apparatus and method would provide four-layer preforms or closures with more evenly and uniformly distributed barrier layers, and thus, better protection for the contents of the preforms or closures, without increasing the cycle or production time for the preforms or closures. Moreover, it would also be desirable to have an apparatus and method for injection molding of four-layer preforms or closures that avoids the problems associated with large and/or small passages or channel for barrier material.

SUMMARY OF THE INVENTION

The present invention provides an injection molding apparatus for multi-layer molding comprising a central melt channel and an annular melt channel radially spaced from the central melt channel. The apparatus also comprises a first melt passage in communication with the annular melt channel, a second melt passage in communication with the central melt channel, and a third melt passage in communication with the central melt channel.

In addition, the present invention provides an injection molding apparatus for multi-layer molding that comprises a central melt channel having a first portion for flow of a first material, a second portion for flow of the first material and a second material, and a flow extension connecting the first portion and the second portion. The flow extension also has a flow opening. The apparatus further comprises an annular ring channel surrounding the central melt channel for flow of the second material. The annular ring channel is also in communication with the flow opening of the flow extension. The apparatus also comprises an annular melt channel radially spaced from the central melt channel for flow of a third material.

Moreover, the present invention also provides an injection molding apparatus for multi-layer molding comprising a central melt channel for flow of a first material and a second material, and an annular melt channel radially spaced from the central melt channel for flow of a third material. The apparatus also comprises a cavity for receiving flow of the first material and the second material from the central melt channel, and for receiving flow of the third material from the annular melt channel.

The present invention also provides a method for injection molding of multi-layer products comprising the step of injecting a first material from a first melt passage into an annular melt channel radially spaced from a central melt channel. The method also comprises the step of injecting a second material from a second melt passage into the central melt channel. In addition, the method comprises the step of injecting a third material from a third melt passage into the central melt channel.

Furthermore, the present invention provides a method for injection molding of multi-layer products comprising the steps of injecting a first material into a central melt channel having a first portion, a second portion, and a flow extension connecting the first and second portions, and injecting a second material into an annular ring channel surrounding the central melt channel. The method also comprises the step of injecting the second material from the annular ring channel into the central melt channel through a flow opening in the flow extension. In addition, the method comprises the steps of injecting a third material into an annular melt channel radially spaced from the central melt channel, and joining the third material from the annular melt channel with the first and second materials from the central melt channel.

The present invention also provides a method for injection molding of multi-layer products comprising the steps of injecting a first material and a second material into a central melt channel, and injecting the first material and the second material from the central melt channel into a cavity. In addition, the method comprises the steps of injecting a third material into an annular melt channel radially spaced from the central melt channel, and injecting the third material from the annular melt channel into the cavity.

Additionally, the present invention provides an article of injection molding comprising an outer layer and an inner layer made from a first material from an annular melt channel. The article also comprises a core layer between the outer and inner layers, and an intermediate layer between the inner layer and the core layer. The core layer is made from a second material from a central melt channel, and the intermediate layer is made from a third material from the central melt channel.

BRIEF DESCRIPTION OF THE DRAWINGS

FIG. 2 is an exploded cross-sectional view of a portion of a valve bushing of the injection molding apparatus of FIG. 1.

FIG. 3 is an exploded cross-sectional view of the portion of the valve bushing of FIG. 2.

DETAILED DESCRIPTION OF PREFERRED EMBODIMENTS

Figure 1:
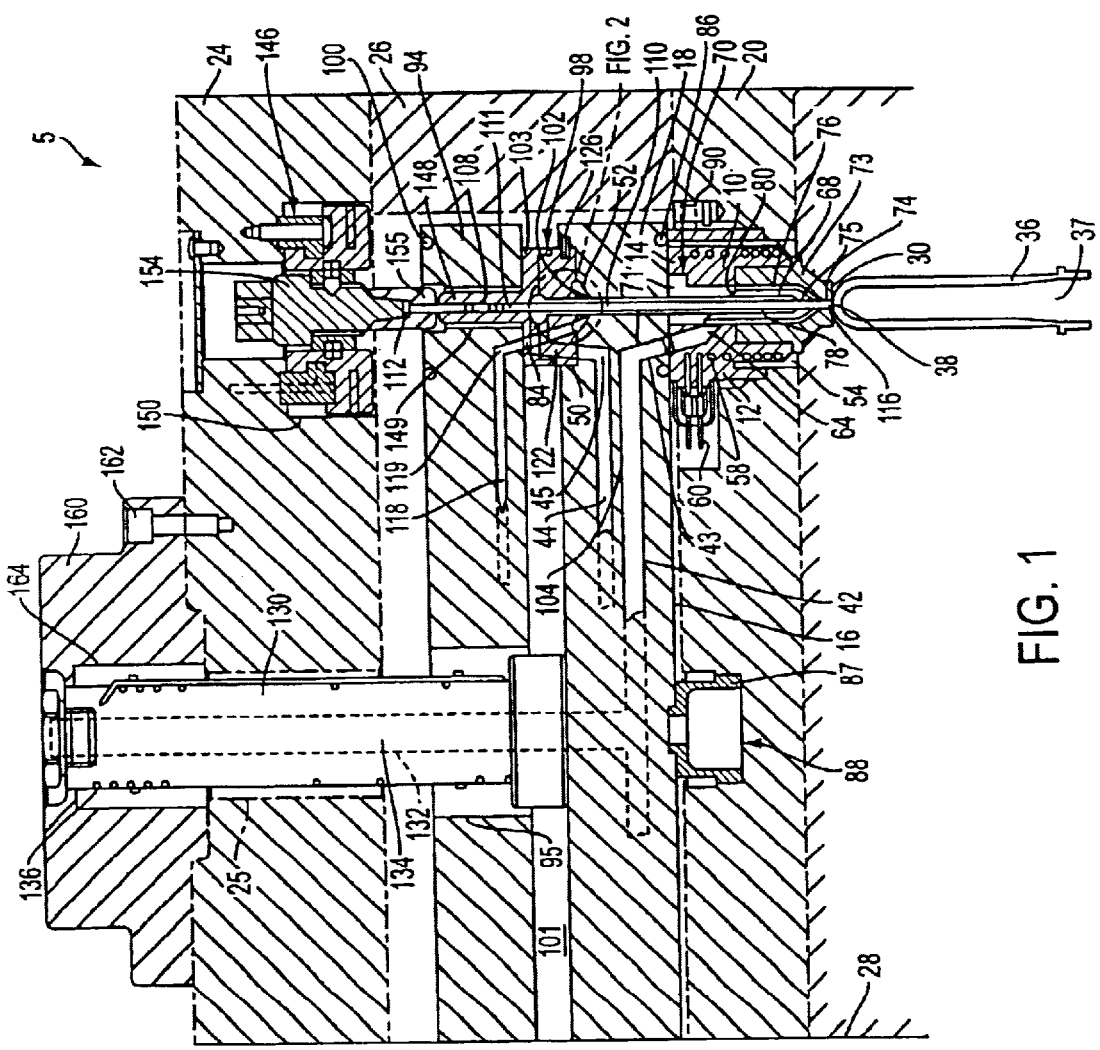
FIG. 1 is a cross-sectional view of a valve-gated injection molding apparatus of the present invention for a four layer bottle preform.

Turning now to the drawings, FIG. 1 shows a preferred embodiment of a portion of a valve-gated, multi-cavity injection molding apparatus 5 of the present invention with one nozzle 10 for molding four-layer bottle preforms, closures, or other products by sequential and simultaneous coinjection. Although only one nozzle is shown in FIG. 1 for ease of illustration, any desirable number of nozzles (i.e., 12, 16, or 48) may be used with the apparatus of the present invention. Preferably, each additional nozzle would have identical features to the nozzle 10 shown in FIG. 1 and described in detail below.

Besides the nozzle 10, the apparatus 5 also comprises a front melt distribution manifold 18, a nozzle retainer plate 20, a back plate 24, a cavity retainer plate 28, and a rear melt distribution manifold 94. Preferably, the nozzle retainer plate 20 and the back plate 24 are joined together with a manifold plate 26. It should also be understood that the apparatus 5 can have a greater or fewer number of plates depending upon the application, and for ease of illustration, only the above-identified plates are shown in FIG. 1.

The nozzle retainer plate 20 is located about an end 87 of a manifold locator 88 between the front melt distribution manifold 18 and the cavity retainer plate 28. The nozzle retainer plate 20 has a nozzle seat opening 54 for receiving the nozzle 10. Preferably, there is a separate nozzle seat opening for every nozzle of the injection molding apparatus. The nozzle retainer plate 20 also preferably has an anti-rotational cam 90 next to the nozzle 10 to prevent the nozzle from rotating within its respective nozzle seat opening 54.

The nozzle 10 has a body 12 with a front tip end 30 and a rear end 14. The nozzle is heated by an integral electrical heating element 58 wrapped around the body 12. The heating element 58 has a terminal 60 positioned near the rear end of the nozzle. The nozzle 10 also has a radial melt channel 64 extending from the rear end 14. In addition, the nozzle 10 has a nozzle gate seal 73 that is secured within the body 12 of the nozzle 10 and forms the front tip end 30. Also, the nozzles gate seal 73 has a front opening 74 to allow material to pass out through the front tip end 30 of the nozzle 10.

The nozzle also has a liner sleeve 70 secured within the nozzle gate seal 73. The liner sleeve 70 has a front opening 75 aligned with and near the front opening 74 of the nozzle gate seal 73, and a rear end 71 corresponding to the rear end 14 of the nozzle 10. Together the liner sleeve 70 and the nozzle seal 73 form an annular melt channel 76 between them that extends throughout the nozzle gate seal 73, and is in fluid communication with the radial melt channel 64. Preferably, the liner sleeve 70 also has an angled flange 80 near the nozzle gate seal 73 to direct the flow of material from the radial melt channel 64 into the annular melt channel 76.

In addition, the liner sleeve 70 has a central bore 68 that extends throughout the body 12 and to the rear end 14 of the nozzle 10. The central bore 68 of the liner sleeve 70 is designed to receive an elongated valve pin 110. The central bore 68 also defines a portion of a central melt channel 78 for the flow of material around the valve pin 110 and through the nozzle 10. As shown in FIG. 1, the annular melt channel 76 is radially spaced from the central melt channel 78.

The valve pin 110 has a body 111, a head 112, and a front tip 116 opposite the head 112. The front tip 116 may be either squared off, as shown in FIGS. 1, 4A–4E, and 5, or tapered (not shown). The front tip 116 is also designed to fit within the front opening 74 of the nozzle gate seal 73. In addition, the valve pin 110 is capable of being moved forward and backward to several different positions, as described in more detail below.

The front melt distribution manifold 18 is positioned on the manifold locator 88 between the nozzle retainer plate 20 and the rear melt distribution manifold 94. The front melt distribution manifold 18 is heated by an integral electrical heating element 86 and has a front face 16 that abuts against the rear end 14 of the nozzle 10. The front melt distribution manifold 18 also has at least one bushing seat opening 50 with a recessed portion 52 for receiving a valve bushing 98, and at least one melt bore 104, with a diameter 104a, in communication with the central bore 68 of the liner sleeve 70. Like the central bore 68, the melt bore 104 is designed to receive the valve pin 110, and defines another portion of the central melt channel 78 for the flow of material around the valve pin 110 and through the front melt distribution manifold 18. Preferably, the front melt distribution manifold 18 has a bushing seat opening 50 and a melt bore 104 for each nozzle 10 used in the apparatus 5.

In addition, the front melt distribution manifold 18 has a first melt passage 42 with an L-shaped melt portion 43 extending forward through the front melt distribution manifold 18 and in communication with the radial melt channel 64 of the nozzle 10. The melt portion 43 allows material to flow from the first melt passage 42 into the radial melt channel 64 and then into the annular melt channel 76 of the nozzle 10. Accordingly, the melt portion 43, and thus the first melt passage 42, is in communication with the annular melt channel 76 through the radial melt channel 64.

As shown in FIG. 1, a melt inlet nozzle 130 abuts against the front melt distribution manifold 18 opposite the nozzle retainer plate 20. The melt inlet nozzle 130 has a central bore 132 partially defining a main melt passage 134 that extends throughout the melt inlet nozzle 130 and into the front melt distribution manifold 18. The main melt passage is in fluid communication with the first melt passage 42 of the front melt distribution manifold 18 and an injection cylinder (not shown) for supplying a virgin preform material 200, such as polyethylene terephthalate ("PET"). The melt inlet nozzle 130 also has a heating element 136.

The front melt distribution manifold 18 also has a second melt passage 44 with an L-shaped melt portion 45 extending backward through the front melt distribution manifold 18 and in communication with the bushing seat opening 50. The second melt passage 44 is also in communication with an injection cylinder (not shown) for supplying a recycled preform material 250, such as recycled PET. Recycled preform material is preferably used since it is less expensive, both economically and environmentally, than virgin preform material. The melt portion 45 allows the recycled preform material to flow from the second melt passage 44 backward into the valve bushing 98 seated in the bushing seat opening 50, as explained in more detail below.

The apparatus 5 also comprises a rear melt distribution manifold 94 positioned on the manifold locator 88 between, but preferably spaced apart from, the front melt distribution manifold 18 and the back plate 24, as shown in FIG. 1. The rear melt distribution manifold has a central bore 95 for receiving the melt inlet nozzle 130. The rear melt distribution manifold 94 also has a third melt passage 118 in communication with an injection cylinder (not shown) for supplying a barrier material 300, such as nylon or ethylene vinyl alcohol ("EVOH"). The third melt passage 118 also has an L-shaped portion 119 extending forward out the rear melt distribution manifold 94. In addition, the rear melt distribution manifold 94 has a bushing bore 149 aligned with the melt bore 104 of the front melt distribution manifold 18. As described in more detail below, the rear melt distribution manifold 94 is heated by an integral electrical heating element 100 to a lower operating temperature than the front melt distribution manifold 18, and the air space 101 provided between the two manifolds 18, 94 provides thermal separation between them.

The apparatus 5 of the present invention also includes a valve bushing 98 positioned between the manifolds 18, 94, and seated within the bushing seat opening 50 of the first melt distribution manifold 18. In order to facilitate its manufacture, the valve bushing 98 is preferably made of a plurality of components that are brazed together to form a single integral component. As shown in FIG. 1, the valve bushing 98 has a tip protrusion 102 extending forwardly from a middle head portion 103 into the recessed portion 52 of the front melt distribution manifold 18. Together, the tip protrusion 102 and the recessed portion 52 form an annular ring channel 106 between them, as shown in FIG. 2. The annular ring channel 106 surrounds the central melt channel 78. The valve bushing 98 also has an elongated rear stem portion 148 extending rearwardly from the middle head portion 103 through the bushing bore 149 in the rear melt distribution manifold 94. A dowel pin 126 located between the middle head portion 103 and the front melt distribution manifold 18 accurately retains the valve bushing 98 in place and prevents it from rotating.

The valve bushing 98 also has a central bore 108, which extends through the tip protrusion 102, the middle head portion 103, and the stem portion 148. As shown in FIG. 2, similar to the central bore 68 and the melt bore 104, the central bore 108 has a first diameter 108a for receiving the valve pin 110, and defining the a portion of the central melt channel 78 for the flow of material around the valve pin 110 and through the valve bushing 98. The first diameter 108a of the central bore 108 is preferably smaller, however, than the diameter 104 of the melt bore 104. The central bore 108 also has a second diameter 108b for receiving just the valve pin 110, and for preventing the flow of material rearwardly through the valve bushing 98.

As shown in FIG. 3, the central bore 108 of the valve bushing 98 and the melt bore 104 of the front melt distribution manifold 18 are joined together with a flow extension 105, which also forms a portion of the central melt channel 78. The flow extension 105 has an annular flow opening 109 in communication with the annular ring channel 106. Preferably, the annular flow opening 109 is sized to be substantially equal to the difference between the diameters 104a, 108a of the melt bore 104 and the central bore 108, respectively. In other words, the width of the central melt channel 78 is preferably increased to accommodate the additional material flow from the annular ring channel 106, without interrupting or affecting the flow of other material in the central melt channel. It should also be understood that the amount of material flowing from the annular ring channel 106 may be controlled by increasing (i.e., more flow) or decreasing (i.e., less flow) the size of the annular flow opening 109.

As shown in FIGS. 1–2, the valve bushing 98 has an L-shaped first transitional melt passage 122 and a second transitional melt passage 84. The first transitional melt passage 122 is aligned and in communication with both the melt portion 45 of the second melt passage 44 of the front melt distribution manifold 18, and an annular passage 123 in the middle head portion 103 of the valve bushing 98. The annular passage 123 is also in communication with the central bore 108 of the valve bushing 98, as best shown in FIG. 2. Accordingly, the melt portion 45, and thus the second melt passage 44, is in communication with the central melt channel 78 through the first transitional melt passage 122 and the annular passage 123.

The second transitional melt passage 84 is in communication with both the L-shaped portion 119 of the third melt passage 118 and an annular ring groove 107 disposed around the tip protrusion 102 of the valve bushing 98. The annular ring groove 107 is also in communication with the annular ring channel 106, as best shown in FIG. 2. Accordingly, the L-shaped portion 119, and thus the third melt passage 118, is in communication with the annular ring channel 106 through the second transitional melt passage 84 and the annular ring groove 107.

The back plate 24 of the apparatus 5 of the present invention is positioned on the manifold locator 88 next to the rear melt distribution manifold 94 opposite the front melt distribution manifold 18. The back plate 24 has a central bore 25 aligned with the central bore 95 of the rear melt distribution manifold 94 for receiving the melt inlet nozzle 130. In addition, a locating ring 160 is preferably attached with one or more bolts 162 to the back plate 24 opposite the rear melt distribution manifold 94. The locating ring 160 also has a central bore 164 aligned with the central bore 25 of the back plate 24 for receiving the melt inlet nozzle 130.

The back plate 24 preferably has a piston seat opening 150 aligned with the bushing bore 149 of the rear melt distribution manifold 94. An actuating mechanism 146 is positioned within the piston seat opening 150. The actuating mechanism 146 comprises a piston cylinder 154 and an end cap 155 for connecting the head 112 of the valve pin 110 to the piston cylinder 154. During operation of the actuating mechanism 146, the piston cylinder 154 and the end cap 155 may extend into a portion of the bushing bore 149, as shown in FIG. 1. The piston cylinder 154 is preferably driven by controlled fluid pressure (i.e., from oil or water) applied through one or more ducts (not shown). It should be understood that while only a hydraulic actuating mechanism is described and shown herein, other types of actuating mechanisms, such as electro-mechanical mechanisms, can be used with the apparatus of the present invention.

Driving the piston cylinder 154 forward causes the valve pin 110 to move forward toward the cavity retainer plate 28. Moving the piston cylinder 154 all the way forward causes the front tip end 116 of the valve pin 110 to be seated within the front opening 74 of the nozzle gate seal 73, thereby cutting off fluid communication between the melt channels 76, 78 and the front opening 74 of the nozzle gate seal 73. On the other hand, driving the piston cylinder 154 backward causes the valve pin 110 to move backward away from the cavity retainer plate 28. Moving the piston cylinder 154 backward past the front opening 74 of the nozzle gate seal 73 causes the front tip end 116 of the valve pin 110 to be withdrawn from the front opening 74 of the nozzle gate seal 73, thereby establishing fluid communication between the annular melt channel 76 and the front opening 74 of the nozzle gate seal 73. In addition, moving the piston cylinder 154 backward past the front opening 75 of the liner sleeve 70 causes the front tip end 116 of the valve pin 110 move backward past the front opening 75 of the liner sleeve 70, thereby establishing fluid communication between not only the annular melt channel 76 and the front opening 74 of the nozzle gate seal 73, but also between the central melt channel 78 and the front opening 74 of the nozzle gate seal 73.

Figure 5:
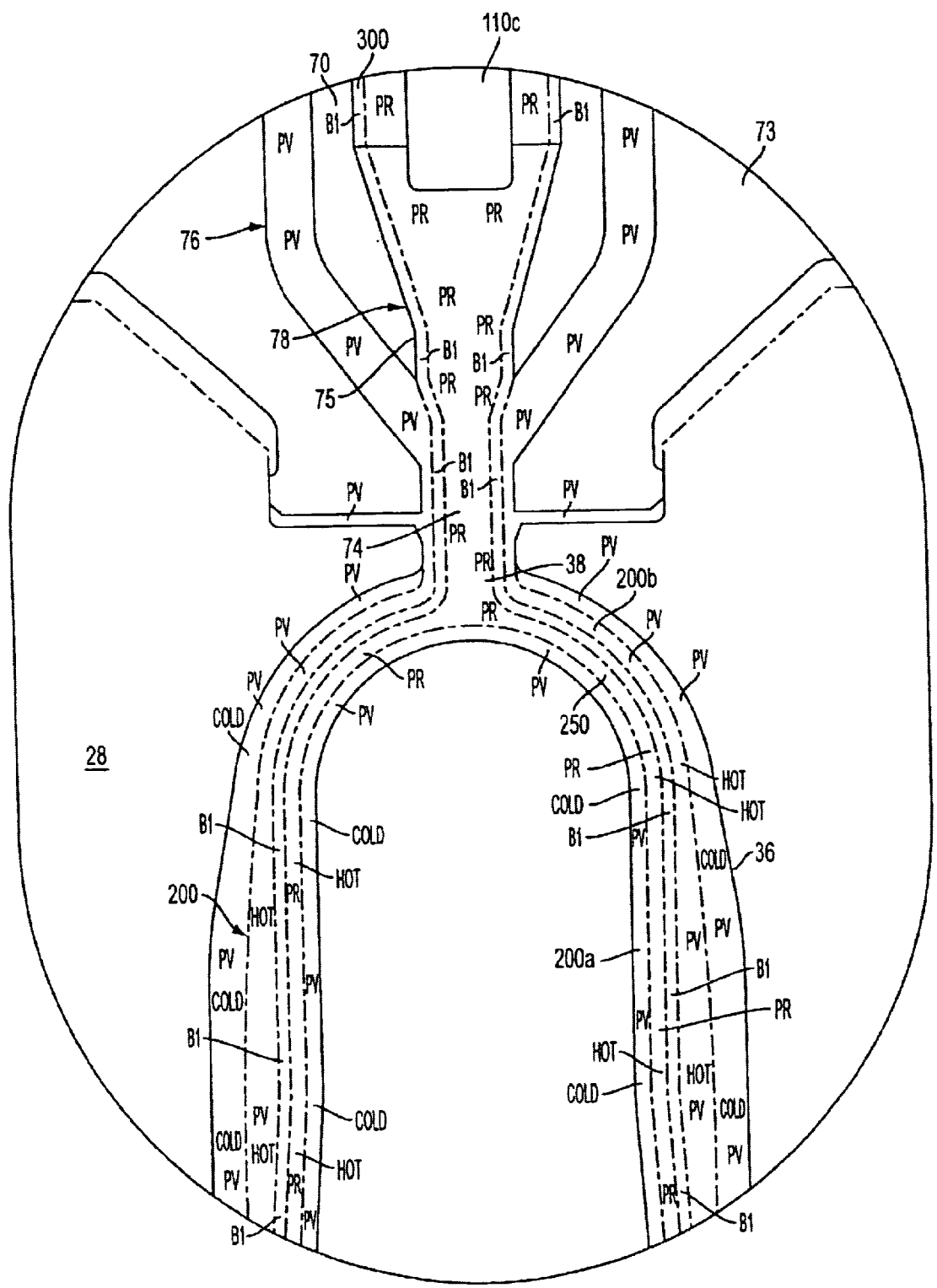
FIG. 5 is an exploded cross-sectional view of FIG. 4C.

As shown in FIGS. 1 and 5, the cavity retainer plate 28 of the present invention has a cavity 36 around a mold core 37. The cavity 36 has a cavity opening 38 aligned with the front opening 74 of the nozzle gate seal 73. The cavity 36 may have any number of shapes and configurations depending on the desired product to be molded. As shown in FIG. 1, the cavity preferably, but not necessarily, has the shape of a bottle preform with a threaded end. It should be understood that by altering the cavity 36, one may mold other bottle preforms of different shapes and configurations, or products different from bottle preforms, such as closures, and the present invention is not limited to the molding of only the bottle preform shown or even other types of preforms.

It should also be understood that the apparatus 5 of the present invention, especially its nozzles, may also have one or more heating systems, cooling systems, and insulative air spaces to maintain the proper temperatures for its components and the materials flowing through the apparatus. Examples of suitable heating systems, cooling systems, and insulative air spaces for the apparatus of the present invention are described in U.S. patent application Ser. No. 08/969, 764, entitled "Sprue Gated Five Layer Injection Molding Apparatus," filed on Nov. 13, 1997, as well as U.S. Pat. Nos. 5,094,603, 5,135,377, and 5,223,275 to Gellert, which are all specifically incorporated in their entirety herein by reference.

The operation of the apparatus of the present invention will now be described with particular reference to FIGS. 4A–4E and 5. While the formation of only a four layer bottle preform is shown in the drawings and described below, it should be understood that other types of four layer preforms or products different than preforms, such as closures, with different material characteristics, may be the resulting products of the apparatus and method of the present invention.

Figure 4A:
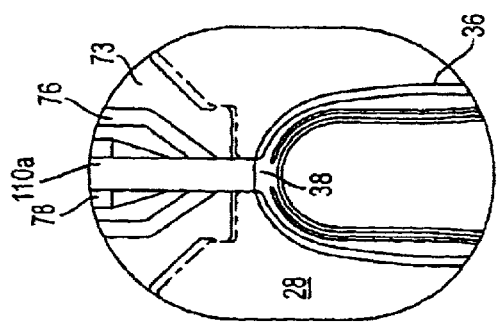
FIGS. 4A–4E are exploded cross-sectional views of a nozzle and a cavity of the apparatus of FIG. 1, illustrating a method of the present invention.

As shown in FIG. 4A, the method of the present invention begins with the valve pin fully inserted through the front opening 74 of the nozzle gate seal 73 by the forward motion of the piston cylinder 154. As a result, fluid communication between the annular melt channel 76, the central melt channel 78, and the front opening 74 of the nozzle gate seal 73 is cutoff. In this position, the valve pin is identified by the reference numeral 110a. Electrical power is then applied to the heating elements 58, 86, 136 of the nozzle 10, the front melt distribution manifold 18, and the melt inlet nozzle 130, respectively, to heat them to an operating temperature for the virgin preform material disposed within the main melt passage 134 and the first melt passage 42, and the recycled preform material disposed within the second melt passage 44. If PET is used for the virgin and recycled preform materials, the preferred operating temperature is about 565° F.

Figure 4B:
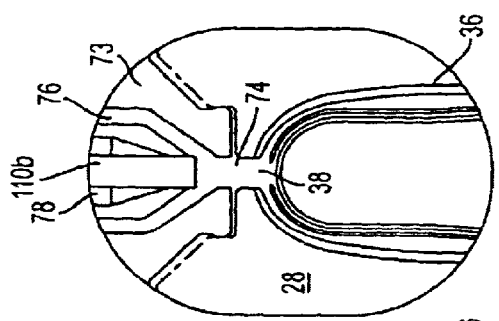

Next, the valve pin is pulled out of the front opening of the nozzle gate seal by the backward motion of the piston cylinder, as shown in FIG. 4B. As a result, fluid communication is established between the annular melt channel and the front opening of the nozzle gate seal, but not between the central melt channel and the front opening of the nozzle gate seal. In this position, the valve pin is identified by the reference numeral 110b.

Injection pressure is then applied to the main melt passage 134 to force a first portion 200a of virgin preform material through the first melt passage 42 and into the melt portion 43. From there, the first portion 200a of virgin preform material flows through the radial melt channel 64 aligned with the melt portion 43, into the annular melt channel 76, out the front opening 74 of the nozzle gate seal 73, and into the cavity opening 38. Injection pressure is applied until the first portion 200a of virgin preform material fills the cavity 36, as shown in FIG. 4B. The first portion 200a of virgin preform material begins to cool as it fills the cavity 36.

Figure 4C:
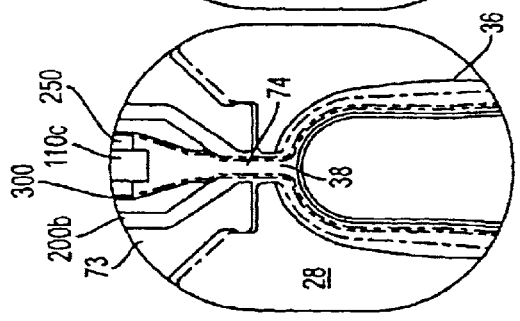

Electrical power is then applied to the heating element 100 in the rear melt distribution manifold 94 to heat it to an operating temperature for the barrier material 300 disposed within the third melt passage 118. If nylon is used for the barrier material, the preferred operating temperature is about 400° F. Next, the valve pin is pulled out of the front opening 75 of the liner sleeve 70 by the backward motion of the piston cylinder, as shown in FIG. 4C. As a result, fluid communication is established between not only the annular melt channel and the front opening of the nozzle gate seal, but also between the central melt channel and the front opening of the nozzle gate seal. In this position, the valve pin is identified by the reference numeral 110c.

Injection pressure is then applied to the main melt passage 134 to force a second portion 200b of virgin preform material through the first melt passage 42 and into its melt portion 43. From there, the second portion 200b of virgin preform material flows through the radial melt channel 64 aligned with the first melt portion 43 and into the annular melt channel 76. Injection pressure is also applied to the recycled preform material 250 in the second melt passage 44 to force the recycled preform material through the second melt passage 44 and into its melt portion 45. From there, the recycled preform material 250 flows through the L-shaped first transitional melt passage 122 aligned with the melt portion 45 of the second melt passage 44, and into the annular passage 123 of the valve bushing 98. The recycled preform material 250 also flows from the annular passage 123 into the central melt channel 78 and around the valve pin 110 toward the cavity 36.

At about the same time, injection pressure is applied to the barrier material 300 in the third melt passage 118 to force the barrier material through the third melt passage 118 and into its L-shaped portion 119. From there, the barrier material 300 flows into the second transitional melt passage 84, through the annular ring groove 107, and into the annular ring channel 106. As best shown in FIG. 3, the barrier material 300 flows from the annular ring channel 106, through the flow opening 109, and into the flow extension 105. The barrier material 300 then joins and surrounds the flow of the recycled preform material 250 in the central melt channel 78. Since the flow opening 109 is preferably sized to be substantially equal to the difference between the diameters 104a, 108a of the melt bore 104 of the front melt distribution manifold 18 and the central bore 108 of the valve bushing 98, respectively, the flow of the barrier material does not interrupt the flow of the recycled preform material. As a result, the flow pressure of the recycled preform material before the flow extension is substantially the same as the flow pressure of the recycled preform material after the flow extension. In addition, since the barrier material flows together with the recycled preform material through the central melt channel 78, as best shown in FIG. 5, degradation and pressure drop problems causes by too large or too small of channels for the barrier material are avoided.

Together, the barrier material 300 and the recycled preform material 250 flow through the central melt channel 78 and around the valve pin 110, and out the front opening 75 of the liner sleeve 70. Here, the barrier material 300 and the recycled preform material 250 are joined and surrounded by the second portion 200b of the virgin preform material flowing from the annular melt channel 76. At this point, the second portion 200b of the virgin preform material, the barrier material 300, and the recycled preform material 250 are all still hot. Together, the second portion 200b of the virgin preform material, the barrier material 300, and the recycled preform material 250 simultaneously flow out the front opening 74 of the nozzle gate seal 73, and into the cavity opening 38. The simultaneous flow of these materials helps reduce the cycle or production time for the resulting perform. Next, the second portion 200b of the hot virgin preform material, the hot barrier material 300, and the hot recycled preform material 250 split the first portion 200a of the cooled virgin preform material in the cavity 36, as shown in FIGS. 4C and 5. Injection pressure is applied to the first, second, and third melt passages 42,44, 118 until the cavity 36 is completely filled with material.

As best shown in FIG. 5, the barrier material 300 is surrounded by, and embedded within, the second portion 200b of hot virgin preform material and the hot recycled preform material 250 as the barrier material 300 flows into the cavity 36. As a result, the second portion 200b of hot virgin preform material and the hot recycled preform material 250 insulate the barrier material 300 from the first portion 200a of cooled virgin preform material already in the cavity 36. This arrangement provides an evenly and uniformly distributed layer of barrier material within the resulting preform.

In addition, since the barrier material 300 is surrounded by the second portion 200b of the hot virgin preform material and the hot recycled preform material 250, the distribution and position of the barrier material 300 within the cavity is properly controlled. In other words, the distribution and positioning of the barrier material 300 is not solely dependent on the cavity, the mold core, and/or the cooled preform material already present in the cavity. Instead, the distribution and positioning of the barrier material for the cavity, and thus the resulting preform, is controlled and balanced by the melt channels before the barrier material enters the cavity 36. The position of the barrier material within the cavity, and thus the resulting preform, may also be set and controlled by manipulating the timing, temperature, and pressure as known in the art. This arrangement ensures that the barrier material will be correctly positioned and balanced within the cavity, and avoids the unbalanced distribution and positioning of the barrier material within the cavity that can be caused, for example, by misalignment or shifting of the mold core 37.

Figure 4D:
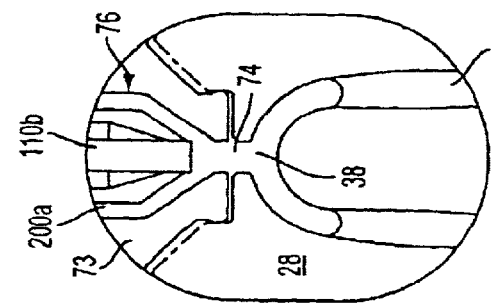
Figure 4E:
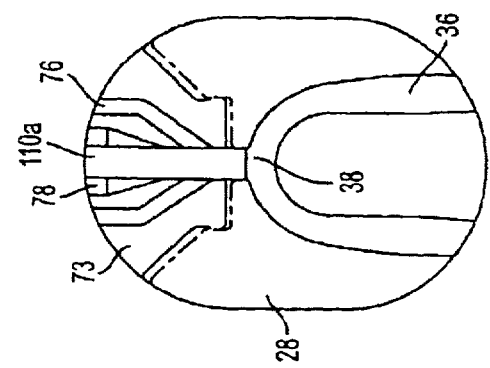

After the cavity 36 is filled, the valve pin is moved forward by the piston cylinder to cutoff material flow and fluid communication between the central melt channel and the front opening of the liner sleeve, as shown in FIG. 4D. As shown in FIG. 4E, the piston cylinder continues to move the valve pin forward until the valve pin is fully inserted into the front opening of the nozzle gate seal, thereby also cutting off material flow and fluid communication between the annular melt channel and the front opening of the nozzle gate seal. Since the valve pin shuts off the flow of material out of the nozzle, it is not necessary to release the injection pressure applied to the preform or barrier materials. Once the cavity is filled and the material flow has stopped, the preform continues to cool until the material has solidified enough to be ejected from the cavity.

Figure 6:
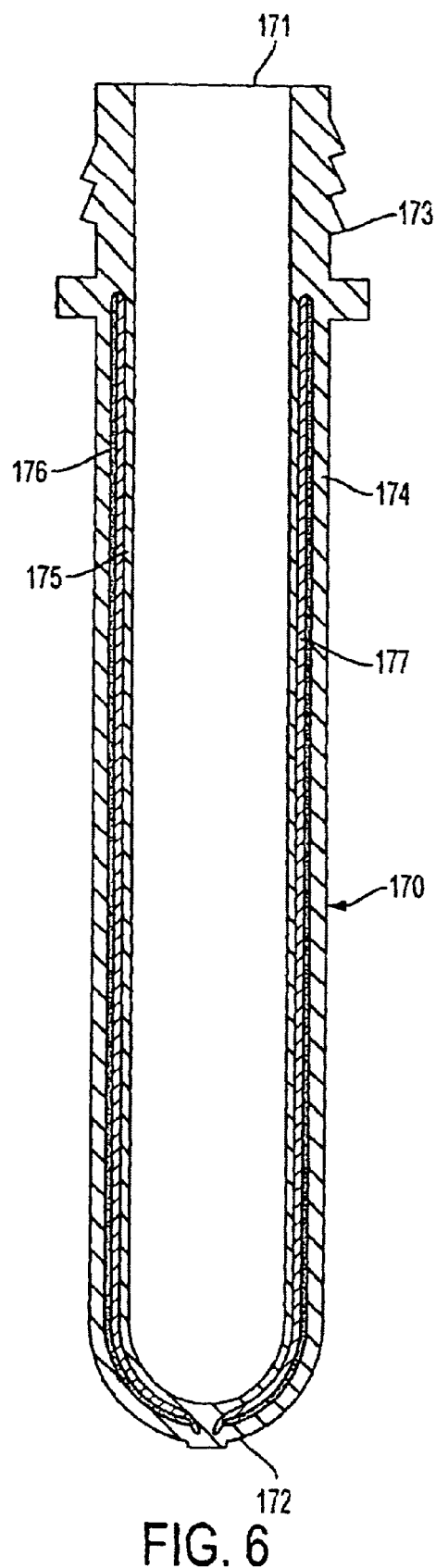
FIG. 6 is a cross-sectional view of a four layer bottle preform of the present invention.

As a result of the apparatus and method of the present invention, a bottle preform 170 may be created, as shown in FIG. 6. The bottle preform 170 has a first open end 171 and a second closed end 172 spaced from and opposite of the first open end. Preferably, but not necessarily, the first open end 171 has threads 173. The bottle preform 170 also has an outer layer 174 of virgin preform material, such as virgin PET, an inner layer 175 of virgin preform material, such as virgin PET, a core layer 176 of barrier material, such as nylon or EVOH, between the outer and inner layers 174, 175 of virgin preform material, and an intermediate layer 177 of recycled preform material, such as recycled PET, between the core layer 176 of barrier material and the inner layer 175 of virgin preform material. The core layer 176 of barrier material and the intermediate layer 177 of recycled preform material preferably extend substantially throughout the bottle preform 170, as shown in FIG. 6. Each layer 174, 175, 176, 177 has several properties, including, but not limited to, thickness, weight, and percentage of total volume ("volume percentage").

By altering the timing and/or the amount of preform or barrier material, the properties of the outer, inner, core, and intermediate layers 174, 175, 176, 177 may also be altered. For instance, by injecting a larger amount of the first and/or second portions 200a, 200b of the virgin preform material into the cavity 36, thicker and heavier outer and/or inner layers 174, 175 of virgin preform material may be formed. Assuming a constant total volume for the cavity, and thus the bottle preform 170, the volume percentage of the virgin preform material will be increased, while the volume percentage of the barrier material 300 and the recycled preform material 250 will be decreased. On the other hand, by injecting a larger amount of barrier material into the cavity, a thicker and heavier core layer 176 of barrier material may be formed. Assuming once again a constant total volume for the cavity, and thus the bottle preform, the volume percentage of the barrier material will be increased, while the volume percentage of the virgin and recycled preform materials will be decreased. Similarly, a thicker and heavier intermediate layer 177 of recycled preform material may be formed by injecting a larger amount of recycled preform material into the cavity. With a constant total volume for the cavity, and thus the bottle preform, the volume percentage of the recycled preform material will be increased, while the volume percentage of the barrier and virgin preform materials will be decreased.

Figure 7:
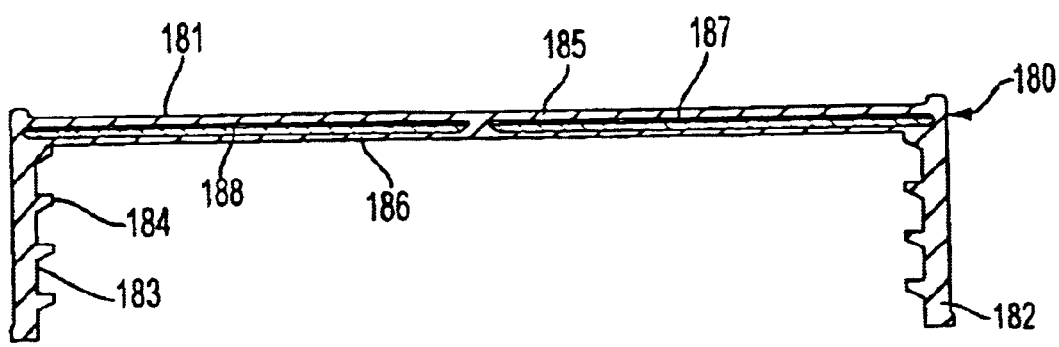
FIG. 7 is a cross-sectional view of a four layer closure of the present invention.

As a result of the apparatus and method of the present invention, a closure 180 may also be created, as shown in FIG. 7. The closure 180 may be made with the same apparatus and method as the bottle perform 170, with the exception that the preform material (i.e., PET) is preferably replaced with a closure material, such as polypropylene. The closure 180 has a base 181 and an annular flange 182 extending outward from the base. The annular flange 182 has an inner side 183, preferably, but not necessarily, with threads 184. The closure 180 also has an outer layer 185 of virgin closure material, such as virgin polypropylene, an inner layer 186 of virgin closure material, such as virgin polypropylene, a core layer 187 of barrier material, such as nylon or EVOH, between the outer and inner layers 185, 186 of virgin closure material, and an intermediate layer 188 of recycled closure material, such as recycled polypropylene, between the core layer 187 of barrier material and the inner layer 186 of virgin closure material. The core layer 187 of barrier material and the intermediate layer of recycled closure material preferably extend substantially throughout the base 181 of the closure 180, as shown in FIG. 7. Each layer 185, 186, 187, 188 has several properties, including, but not limited to, thickness, weight, and percentage of total volume ("volume percentage").

By altering the timing and/or the amount of closure or barrier material, the properties of the outer, inner, core, and intermediate layers 185, 186, 187, 188 may also be altered. For instance, by injecting a larger amount of the first and/or second portions of the virgin closure material into the cavity, thicker and heavier outer and/or inner layers 185, 186 of virgin closure material may be formed. Assuming a constant total volume for the cavity, and thus the closure 180, the volume percentage of the virgin closure material will be increased, while the volume percentage of the barrier material and the recycled closure material will be decreased. On the other hand, by injecting a larger amount of barrier material into the cavity, a thicker and heavier core layer 187 of barrier material may be formed. Assuming once again a constant total volume for the cavity, and thus the closure, the volume percentage of the barrier material will be increased, while the volume percentage of the virgin and recycled closure materials will be decreased.

As an alternative to the valve-gated apparatus 5 shown in FIGS. 1–5 and described above, FIG. 8 shows a preferred embodiment of a portion of a thermal-gated, multi-cavity injection molding apparatus 405 of the present invention. The apparatus 405 is identical to, and operates in the same manner as, the apparatus 5, with only a few exceptions. To avoid redundancy and unnecessary repetition, only the differences between the apparatus 405 and the apparatus 5 will be discussed in detail below. Similarly, for ease of illustration, only some of the components of the apparatus 405 are identified by reference numerals in FIG. 8. Preferably, the non-identified components of the apparatus 405 are identical to the corresponding components of the apparatus 5. In addition, it should be understood that, like the apparatus 5, the apparatus 405 may be used to create both the bottle preform 170 and the closure 180 shown in FIGS. 6–7 and described above.

The primary difference between the apparatus 405 and the apparatus 5 is that the apparatus 405 does not have a valve pin. As a result, the apparatus 405 is manipulated by controlling the injection pressure applied to the first and second melt passages, rather than by controlling the valve pin. In other words, instead of moving a valve pin forward and backward to cutoff and establish the flow of material, the apparatus 405 uses increases and decreases in the injection pressure to cutoff or establish the flow of material. Otherwise, the operation and method of the apparatus 405 is the same as the operation and method of the apparatus 5.

Since the apparatus 405 does not use a valve pin, certain components of the apparatus 5 are no longer necessary for the apparatus 405. For instance, the back plate 424 of the apparatus 405 does not have a piston seat opening 150 or an actuating mechanism 146. Likewise, the rear melt distribution manifold 494 of the apparatus 405 does not have a bushing bore 149. Moreover, the valve bushing 498 of the apparatus 405 does not have a stem portion 148, and the valve bushing 498 has a central bore 508, with only one diameter 108a, that does not extend past the annular passage 123.

Figure 8:
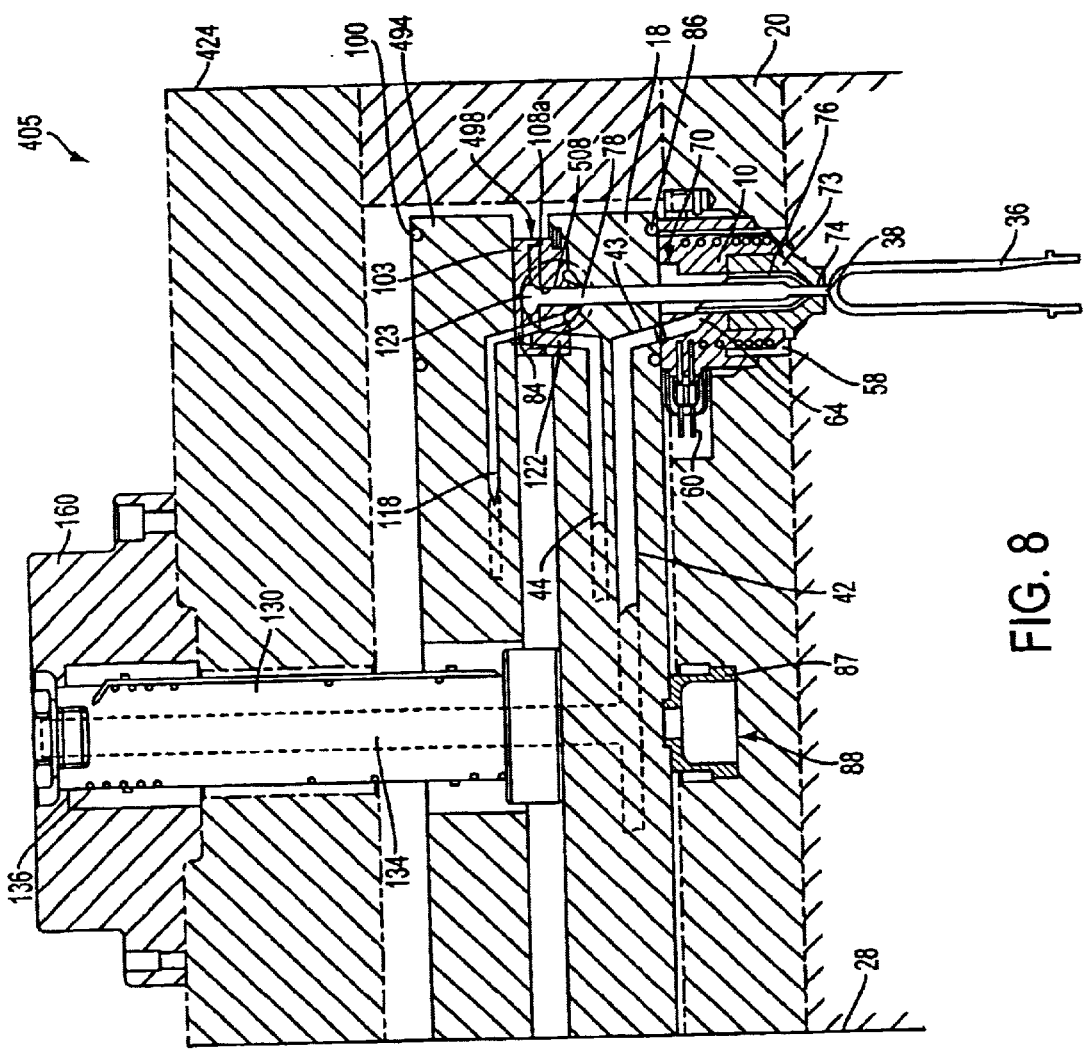
FIG. 8 is a cross-sectional view of a thermal-gated injection molding apparatus of the present invention for a four layer bottle preform.
Figure 9:
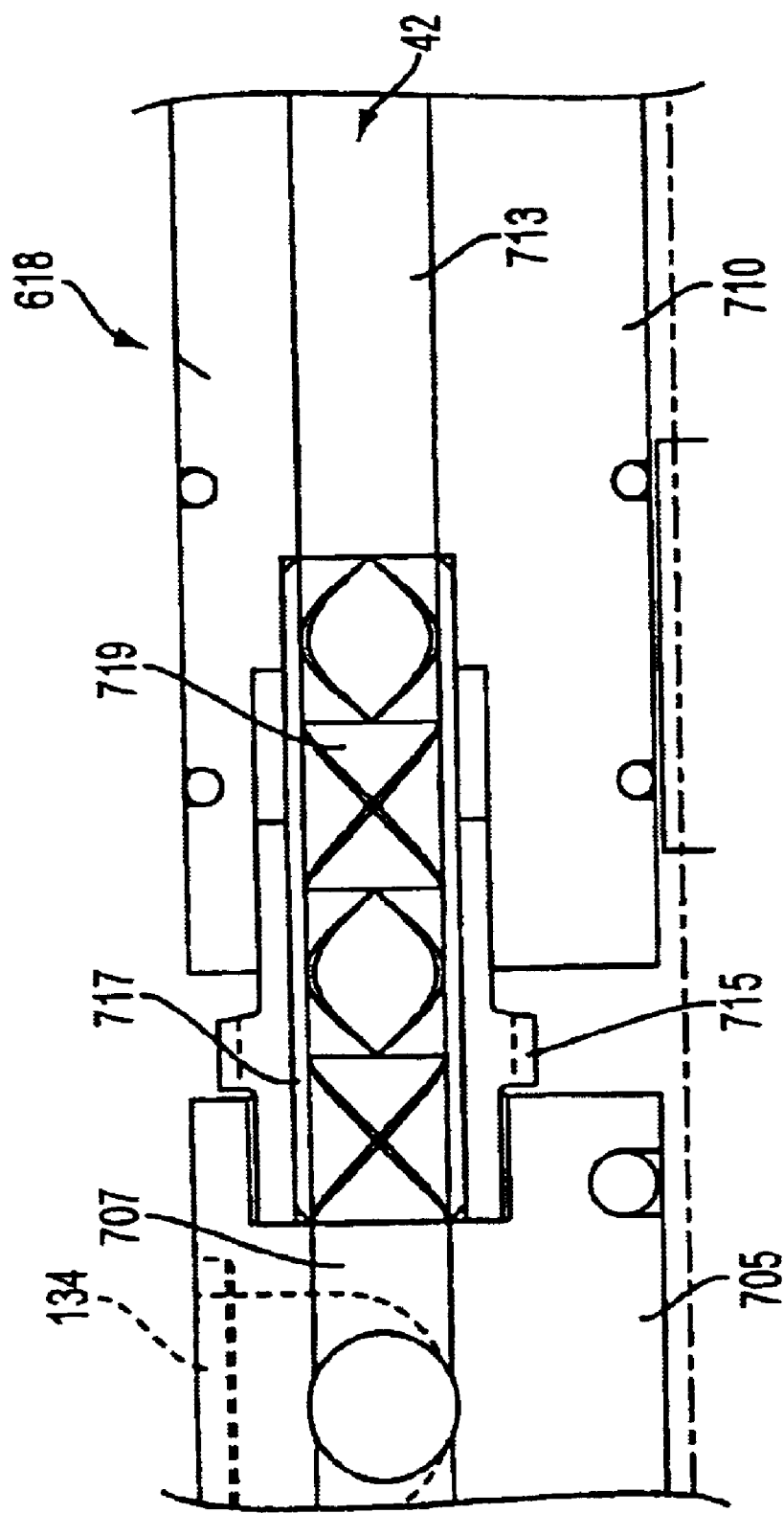
FIG. 9 is a partial cross-sectional view of an alternative front melt distribution manifold of the present invention.

FIG. 9 shows a partial view of another embodiment of a front melt distribution manifold 618 of the present invention. The front melt distribution manifold 618 is identical to, and operates in the same manner as, the front melt distribution manifold 18 described above and shown in FIGS. 1 and 8, with only a few exceptions. In order to avoid redundancy and unnecessary repetition, only the differences between the front melt distribution manifold 618 and the front melt distribution manifold 18 will be discussed in detail below.

As shown in FIG. 9, the front melt distribution manifold 618 comprises a bridge section 705, a sub-manifold section 710 spaced from the bridge section 705, and a melt link 715 joining the bridge section 705 and the sub-manifold section 710. The bridge section 705 has a bridge passage 707 in communication with the main melt passage 134 of the melt inlet nozzle 130, the sub-manifold section 710 has a sub-manifold passage 713 in communication with the first melt passage 42, and the melt link 715 has a link passage 717 in communication with both the bridge passage 707 and the sub-manifold passage 713. An example of a suitable melt link for use with the present invention is disclosed in U.S. Pat. No. 5,843,361, specifically incorporated herein by reference.

A conventional melt mixer 719 (or static mixer) is also positioned in the link passage 717, as shown in FIG. 9. During operation of the present invention, the use of PET for the preform material may generate a certain amount of undesirable acetaldehyde ("AA"). In addition, non-uniform shear stress may take place during the flow of the preform material or the barrier material through the melt channels of the manifolds and/or the nozzle. This non-uniform shear stress can create a non-uniform temperature distribution across the preform or barrier material, thereby creating difficulties with uniformly filling the cavity 36 with the preform and the barrier material. The melt mixer 719, however, addresses these problems and helps to prevent them from occurring or reduce their effects. Specifically, the melt mixer 719 helps reduce the amount of AA generated and improve the temperature uniformity across the material flow. Any of the melt mixers or static mixers known in the prior art may be adapted for use with the present invention. Examples of suitable melt mixers or static mixers are disclosed in U.S. Pat. Nos. 4,541,982, 4,965,028, 5,262,119, and Applicant's DE 3201710 application, all of which are specifically incorporated herein by reference.

Although a melt mixer is shown only in the link passage of the melt link for the front melt distribution manifold, it should be understood that melt mixers or static mixers may be used in a number of different locations throughout the apparatus of the present invention. For instance, a melt mixer may be positioned in a link passage of a melt link for the rear melt distribution manifold 94. In addition, melt mixers may be positioned in the transitional melt passages 84, 122 of the valve bushing 98 and/or in the radial melt channel 64 of the nozzle 10.

Figure 10:
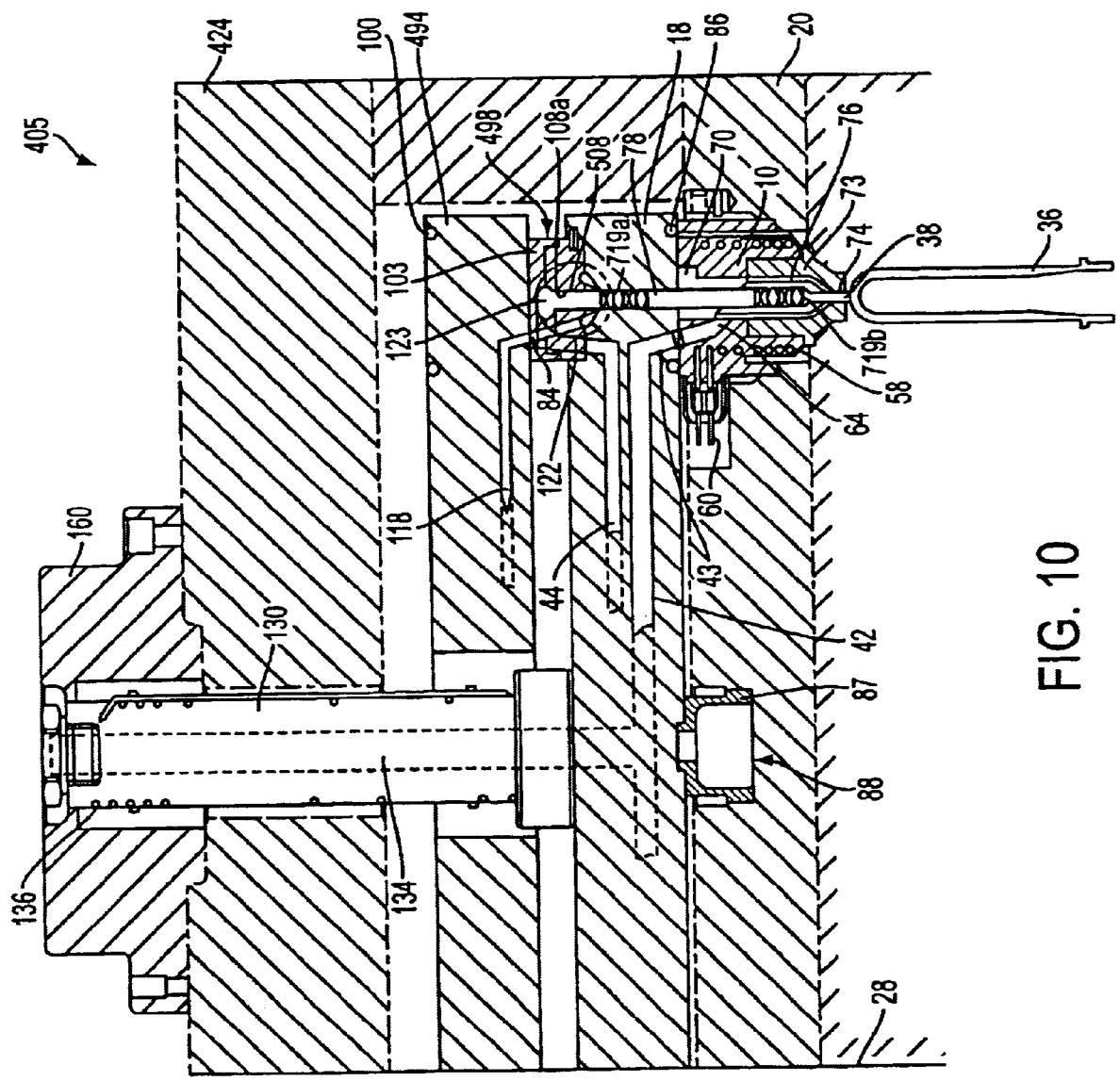
FIG. 10 is a cross-sectional view of the thermal-gated injection molding apparatus of FIG. 8 with melt mixers.

As shown in FIG. 10, one or more melt mixers may also be positioned in the central melt channel 78 of the thermal-gated injection molding apparatus 405 shown in FIG. 8 and described above. Preferably, a first melt mixer 719a is positioned in the central melt channel 78 near the annular ring channel 106 for mixing the barrier material 300 with the recycled preform material 250. Additionally, or alternatively, a second melt mixer 719b is also preferably positioned in the central melt channel 78 near the front opening 74 of the nozzle gate seal 73 for mixing the barrier material 300 with the recycled preform material 250. While both the first and second melt mixers 719a, 719b are shown in FIG. 10, it should be understood that only one or the other, or both, may be used with the thermal-gated injection molding apparatus of the present invention.

The apparatus and methods of the present invention may be applied with particular advantage to preforms and closures for bottles or containers. The four-layer preforms and closures formed by the apparatus and methods of the present invention provide reliable molded products for protecting their contents. Moreover, the use of a recycled preform material reduces the cost of manufacturing the preforms and closures.

It should also be readily apparent from the forgoing description and accompanying drawings that the injection molding apparatus and method of the present invention are an improvement over the prior art. For instance, the apparatus and method of the present invention do not require multiple melt inlets, passages, channels, and gates. Instead, the apparatus and method of the present invention only uses two injection cylinders, two melt passages, and one gate to create four-layer preforms and closures. As a result, the present invention overcomes the disadvantages associated with the prior art injection molding devices and methods by providing a multi-layer injection molding apparatus and method that are relatively simple and inexpensive to both operate and manufacture.

The present invention also overcomes the disadvantages of the prior art injection molding devices and methods by surrounding the barrier material with hot preform material before injecting it into the cavity, thereby avoiding injection of the barrier material directly against a cooled portion of preform material previously disposed in the cavity. Consequently, the present invention provides a four-layer perform and closure with a more evenly and uniformly distributed barrier layer with better protection characteristics. Similarly, unlike the prior art, since the present invention injects the barrier material simultaneously with its surrounding hot preform material, rather than after first injecting hot preform material into the cavity, the cycle time for the preforms or closures is minimized and not increased.

Those skilled in the art to which the invention pertains may make modifications and other embodiments employing the principles of this invention without departing from its spirit or essential characteristics, particularly upon considering the foregoing teachings. For instance, the threads of the bottle preform and/or the closure may be eliminated entirely or replaced with some other fastening feature. In addition, any desirable shape and configuration may be used for the cavity and the resulting bottle preform and/or closure, depending on manufacturing and consumer preferences. Likewise, manufacturing and consumer preferences may also dictate the timing and number of cycles for the operation of the apparatus and methods of the present invention. Also, the recycled preform material may be replaced with another preform material, a barrier material, or a mixture of both. Accordingly, the described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An injection molding apparatus for multi-layer molding comprising:

a central melt channel having a first portion for flow of a first material, a second portion for flow of the first material and a second material, a flow extension connecting the first portion and the second portion, the flow extension having a flow opening, and at least a portion of the central melt channel being in a nozzle and in communication with a front opening in the nozzle;

an annular ring channel around the central melt channel for flow of the second material, the annular ring channel being in communication with the flow opening of the flow extension; and an annular melt channel radially spaced from the central melt channel for flow of a third material, the annular melt channel being in communication with the central melt channel near the front opening in the nozzle;

wherein the first and second materials flow together through the entire portion of the central melt channel in the nozzle.

2. The injection molding apparatus of claim 1 wherein the first portion of the central melt channel has a first diameter, and the second portion of the central melt channel has a second diameter greater than the first diameter.

3. The injection molding apparatus of claim 1 further comprising a cavity for receiving flow of the first material and the second material from the central melt channel simultaneously.

4. The injection molding apparatus of claim 1 further comprising a moveable valve member positioned within the central melt channel, the moveable valve member capable of cutting off flow of the first and second materials from the central melt channel.

5. The injection molding apparatus of claim 1 further comprising a melt mixer.

6. The injection molding apparatus of claim 1 wherein the second portion of the central melt channel maintains flow of the first material and flow of the second material in a side-by-side orientation.

* * * * *